(12) United States Patent
Hamerski et al.

(45) Date of Patent: Nov. 23, 2004
(10) Patent No.: US 6,821,619 B2

(54) STRETCH RELEASING ADHESIVE TAPE WITH DIFFERENTIAL ADHESIVE PROPERTIES

(75) Inventors: Michael D. Hamerski, Baldwin Township, WI (US); James L. Bries, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 163 days.

(21) Appl. No.: 10/142,663

(22) Filed: May 8, 2002

(65) Prior Publication Data

US 2002/0132115 A1 Sep. 19, 2002

Related U.S. Application Data

(62) Division of application No. 09/489,361, filed on Jan. 21, 2000, now Pat. No. 6,410,135.

(51) Int. Cl.⁷ .............................. C09J 7/00; B32B 7/12
(52) U.S. Cl. ................ 428/343; 428/213; 428/355 RA
(58) Field of Search ................................. 428/343, 213, 428/205.3, 354

(56) References Cited

U.S. PATENT DOCUMENTS

| | | |
|---|---|---|
| 4,024,312 A | 5/1977 | Korpman |
| 4,472,480 A | 9/1984 | Olson |
| 5,516,581 A | 5/1996 | Kreckel et al. |
| 5,650,215 A | 7/1997 | Mazurek et al. |
| 6,410,135 B1 | 6/2002 | Hamerski et al. |

FOREIGN PATENT DOCUMENTS

| | | |
|---|---|---|
| DE | 33 31 016 | 7/1992 |
| WO | WO 95/06691 | 3/1995 |
| WO | WO 98/06652 | 2/1998 |
| WO | WO 98/21285 | 5/1998 |
| WO | WO 99/31193 | 6/1999 |

*Primary Examiner*—Terrel Morris
*Assistant Examiner*—Victor S Chang
(74) *Attorney, Agent, or Firm*—David B. Patchett

(57) ABSTRACT

A stretch releasing adhesive tape article including an elongated length of stretch releasing adhesive tape with side surfaces including at least one potential contact surface area. At least a portion of the potential contact surface area includes an adhesive surface. The potential contact surface area includes a first interface surface area in the uncompressed state and a second interface surface area greater than the first interface surface area in the compressed state. The stretch releasing adhesive tape in the uncompressed state can operate as a pull tab. The potential contact surface area in the uncompressed state can include a plurality of raised portions, a non-planar structure, or a discontinuous surface.

3 Claims, 6 Drawing Sheets

STRETCH RELEASING ADHESIVE TAPE WITH DIFFERENTIAL ADHESIVE PROPERTIES

This application is a divisional application of U.S. application Ser. No. 09/489,361, filed Jan. 21, 2000, now U.S. Pat. No. 6,410,135, which is hereby incorporated by reference in its entirety.

FIELD OF THE INVENTION

The present invention relates generally to an elongated stretch releasing adhesive tape article with a geometry that provides differential adhesive properties, and in particular, to a geometry that provides regions of reduced adhesion to form pull-tabs.

BACKGROUND OF THE INVENTION

Stretch releasing adhesive tapes represent an emerging class of high performance pressure-sensitive adhesives combining strong holding power with clean removal and no surface damage. Such stretch releasing adhesive tapes are useful in a wide variety of assembling, joining, attaching, and mounting applications.

Adhesive tape strips that can be cleanly removed from a surface by stretching the tape strip are known in the patented prior art. The Korpman U.S. Pat. No. 4,024,312, for example, discloses a highly conformable adhesive tape including a highly extensible and elastic backing film laminated with an adhesive layer. The backing film possesses a lengthwise elongation at break of at least about 200%. The tape is easily stretchable and may be removed from a surface by stretching the tape lengthwise in a direction substantially parallel to the surface. German Patent No. 33 31 016 discloses a high elasticity, low plasticity adhesive film based on a thermoplastic rubber and tackifying resins, wherein the adhesive bond can be broken by stretching the adhesive film in the direction of the plane of the adhesive bond.

The Kreckel et al. U.S. Pat. No. 5,516,581, assigned to the same assignee as the present invention, discloses a removable adhesive tape having a highly extensible and substantially inelastic backing coated with a layer of pressure sensitive adhesive. The adhesive tape can be removed from a substrate without damaging the substrate by stretching the tape in a direction substantially parallel to the surface of the substrate. The tape backing has a lengthwise elongation at break of from about 150% to about 1200%, a Young's modulus of at least about 2,500 psi to about 72,500 psi, and an elastic recovery of less than about 50% after being stretched and removed. PCT International Publication No. WO 95/06691 discloses a removable foam adhesive tape comprising a backing including a layer of polymeric foam, and a layer of pressure-sensitive adhesive coated on at least one surface of the backing. The foam layer of the backing has a thickness of about 30 to about 1000 mils, and the backing has a lengthwise elongation at break of from about 50% to about 1200%, and a Young's modulus of less than about 2,400 psi.

Commercial stretch releasing adhesive tapes include the product sold under the trade designation COMMAND by Minnesota Mining and Manufacturing Company, St. Paul, Minn., and the product sold under the trade designation POWER-STRIPS by Beiersdorf AG, Hamburg, Germany. These products are currently manufactured as discrete strips with one end of the strip including a non-adhesive pull tab to facilitate stretching of the strip during removal. The adhesive surfaces of the strip are additionally protected with a release liner.

Desirable for certain applications is an elongated stretch releasing adhesive tape strip of indefinite length which can be formed into a roll or stack from which segments of selected length can be cut depending on the end use application. The difficulty with providing a long length of stretch releasing tape which can be cut to a selected length is the ability to provide a pull tab at a specific location on the cut strip to serve as a grasping area for stretching the strip from a surface at the time of removal.

PCT International Publication No. WO 98/06652 discloses a length cutting fixture that can be used to form a non-adhesive pull tab or "gripper" at the end of a long length of a conventional single-sided adhesive tape. The length cutting fixture also serves to cut the long length of tape, now including the gripper, to any selected length. The gripper is formed by folding the end of the tape back onto itself. Such a length cutting fixture, however, cannot be used to form a non-adhesive pull tab on a double-sided adhesive tape.

It is therefore desirable to provide a stretch releasing adhesive tape article in a long length or a roll that can be cut into discrete strips having any selected length, wherein each strip can be provided with a pull tab or stretch removal tab that can be grasped and pulled by a user to remove the adhesive tape from a substrate.

BRIEF SUMMARY OF THE INVENTION

The present invention relates to various embodiments of a stretch releasing adhesive tape with a geometry that provides differential adhesive properties in a compressed state and an uncompressed state. Adhesion and tack can thus be controlled by varying the amount of compression. Additionally, the present stretch releasing adhesive tape can be easily repositioned prior to compression. A portion of the present stretch releasing adhesive tape can be left in the uncompressed state, thereby providing one or more pull tabs. The stretch releasing adhesive tape of the present invention can be provided in strips of varying lengths, in roll form, or in a stack.

In one embodiment, the stretch releasing adhesive tape article includes an elongated length of stretch releasing adhesive tape with side surfaces comprising at least one potential contact surface area. At least a portion of the potential contact surface area comprises an adhesive surface having raised portions. The potential contact surface area comprises a first interface surface area in the uncompressed state and a second interface surface area greater than the first interface surface area in the compressed state. The stretch releasing adhesive tape in the uncompressed state can operate as a pull tab.

In another embodiment, the stretch releasing adhesive tape article comprises an elongated length of stretch releasing adhesive tape with adhesive on all side surfaces. The side surfaces have at least one potential contact surface area. The potential contact surface area has a first interface surface area in an uncompressed state and a second interface surface area greater than the first interface surface area in a compressed state.

In one embodiment, the stretch releasing adhesive tape comprises a multi-layered structure. The stretch releasing adhesive tape can have one or more elastic or inelastic structural members. The structural member can be foam, film, a monofilament or a variety of other materials. A film can optionally be interposed between the adhesive and the structural member or located at the interior of the structural member. The stretch releasing adhesive tape can be one of a pressure sensitive adhesive tape with an elastic structural member, a pressure sensitive adhesive tape with a highly extensible and substantially inelastic structural member, or a solid pressure sensitive adhesive.

In the various embodiments, the potential contact surface area in the uncompressed state can be a plurality of raised portions, a non-planar structure, a discontinuous surface, or combinations thereof. The stretch releasing adhesive tape in the uncompressed state comprises a cross-section selected from circular, star-shaped, oval, multifaceted or any other geometric shape that provides less surface area in the uncompressed state than in the compressed state. In another embodiment, the potential contact surface area comprises a rectangular cross-section of stretch releasing adhesive tape twisted to form helical ridges. The potential contact surface area can have adhesive regions and non-adhesive regions.

The elongated length of stretch releasing adhesive tape can be segments or a roll. A release liner may optionally be used. Frangible connections can be formed intermittently along the stretch releasing adhesive tape.

The present invention is also direct to a method of using a stretch releasing adhesive tape article with differential adhesive properties, including the steps of positioning a potential contact surface area of an elongated length of stretch releasing adhesive tape on a substrate to form a first interface surface area; compressing a portion of the stretch releasing adhesive tape to form a second interface surface area, the second interface surface area being greater than the first interface surface area; and retaining an uncompressed portion of the stretch releasing adhesive tape as a pull tab.

In another method the steps include providing an elongated length of stretch releasing adhesive tape with a generally rectangular cross section; twisting at least a portion of the stretch releasing adhesive tape to form a twisted portion with a plurality of helical ridges; positioning the stretch releasing adhesive tape on a substrate, the twisted portion defining a first interface surface area; compressing an untwisted portion of the stretch releasing adhesive tape against the substrate to form a second interface surface area greater than the first interface surface area; and retaining the twisted portion in an uncompressed state to form a pull tab.

BRIEF DESCRIPTION OF THE SEVERAL VIEWS OF THE DRAWING

The present invention will be further described with reference to the accompanying drawings, in which.

DETAILED DESCRIPTION OF THE INVENTION

Figure 1:
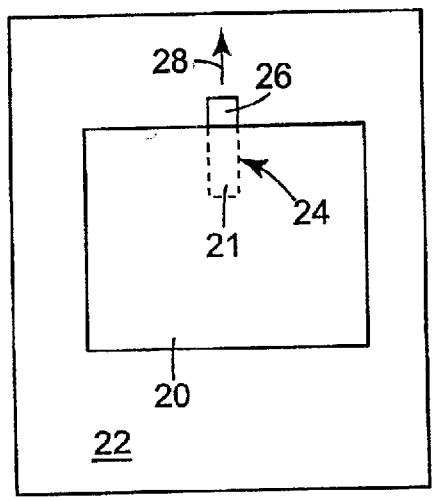
FIG. 1 is a front view of an article attached to a substrate using a stretch releasing adhesive.

FIG. 1 is a front view of an article 20 attached to a substrate 22 using a stretch releasing adhesive tape 24. A portion 21 of the stretch releasing adhesive tape 24 is compressed between the article 20 and the substrate 22 to form an adhesive bond. The stretch releasing adhesive 24 includes a pull tab 26 that extends beyond the perimeter of the article 20. The pull tab 26 typically includes non-adhesive surfaces that prevent bonding with the substrate 22 or the article 20.

Removing the stretch releasing adhesive tape 24 from the article 20 and substrate 22 can be carried out by simply stretching the stretch releasing adhesive tape 24 in the direction 28 and at an angle of less than about 35 degrees with respect to the substrate 22. Removal at the appropriate angle will result in no appreciable adhesive residue on the substrate 22 and in preventing damage to the substrate 22.

Figure 2:
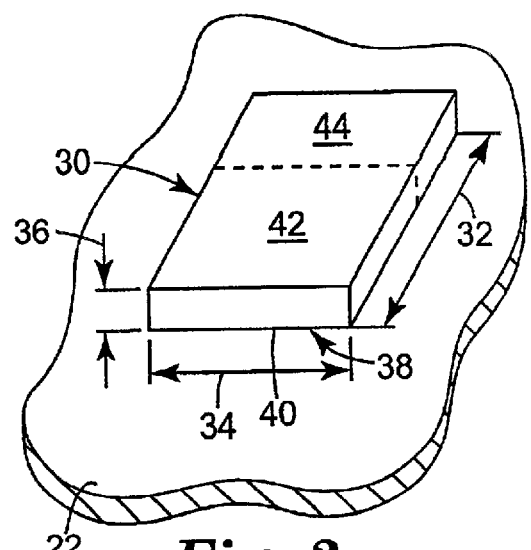
FIG. 2 is perspective view of a stretch releasing adhesive tape with a rectangular shape.

FIG. 2 is a perspective view of a segment of a stretch releasing adhesive tape 30 having a generally rectangular cross section. The stretch releasing adhesive tape 30 has a length 32, a width 34, and a thickness 36. The stretch releasing adhesive tape 30 has a potential contact surface area 38 and a first interface surface area 40 defined by the length 32 times the width 34. As used herein, "potential contact surface area" refers to the surface area on a stretch releasing adhesive tape that can potentially contact a planar substrate, whether or not there is adhesive at the interface with the substrate. For stretch releasing adhesive tapes with a more complex geometry, the potential contact surface area can also be understood as the portion of the side surfaces that are illuminated by a light shined perpendicular through transparent substrate 22 onto the stretch releasing adhesive tape. The "first interface surface area" refers to the surface area formed at the actual physical interface between the stretch releasing adhesive tape and the substrate 22 in the uncompressed state. Due to the geometry of the stretch releasing adhesive tape 30, the potential contact surface area 38 on the stretch releasing adhesive tape 30 and the first interface surface area 40 with the substrate 22 are substantially the same.

In the embodiment illustrated in FIG. 2, portion 42 of the stretch releasing adhesive 30 is compressed against the substrate 22, while portion 44 remains uncompressed. No pull tab is provided. The portion 42 forms a strong adhesive bond with the substrate 22, while the portion 44 initially forms less of an adhesive bond. Over time, however, the uncompressed portion 44 will wet-out against the substrate 22 and build adhesion. Consequently, the interface surface area 40 is effectively the same whether all or a portion of the stretch releasing adhesive tape 30 is compressed against the substrate 22.

Figure 3A:
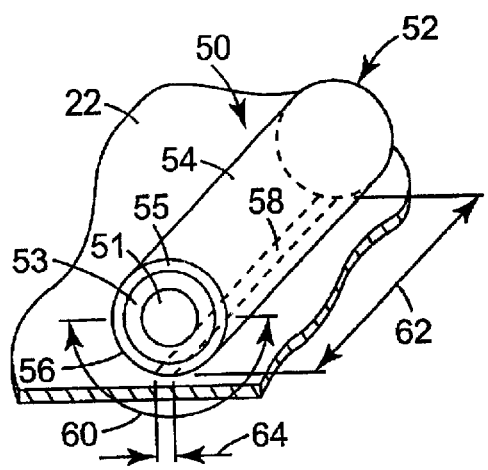
FIG. 3A is a perspective view of a stretch releasing adhesive tape in an uncompressed state in accordance with the present invention.
Figure 3B:
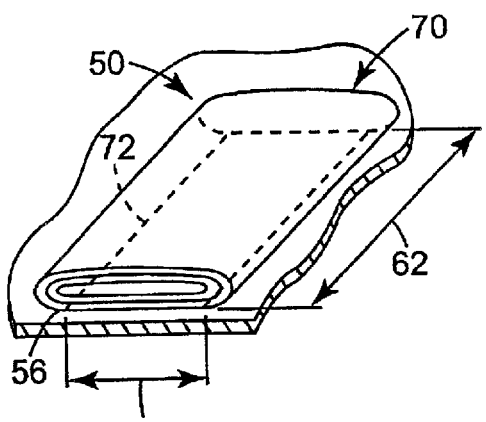
FIG. 3B is a perspective view of the stretch releasing adhesive tape of FIG. 3A in a compressed state.

FIGS. 3A and 3B illustrate a stretch releasing adhesive tape 50 with differential adhesive properties in accordance with the present invention. Side surfaces 54 of the stretch releasing adhesive tape 50 include a pressure sensitive adhesive. The pressure sensitive adhesive can cover some or all of the side surfaces 54. For example, the pressure sensitive adhesive can be a continuous or discontinuous region on the side surfaces 54. In the illustrated embodiment, the stretch releasing adhesive tape 50 is a multi-layered structure, including a structural member 51, such as an elastic or inelastic foam, and a film 53 interposed between the structural member 51 and the adhesive layer 55 that defines the side surfaces 54. The structural member 51 can be concentric or non-concentric with the adhesive layer 55, hollow or solid, or symmetrical or asymmetrical with the adhesive layer 55. Any conventionally known stretch releasing tape, however, can be used in the various embodiments of the present invention, including a pressure sensitive adhesive tape with an elastic core, a pressure sensitive adhesive tape with a highly extensible and substantially inelastic core, or a solid pressure sensitive adhesive. These various structures can be used with any embodiment of the present invention.

Specific tapes suitable for use in the various embodiments of the present invention include the pressure sensitive adhesive tapes with elastic backings described in U.S. Pat. No. 4,024,312 (Korpman), the pressure sensitive adhesive tapes with highly extensible and substantially inelastic backings described in U.S. Pat. No. 5,516,581 (Kreckel et al.) and PCT International Publication No. WO 95/06691 (Bries et al); and the solid pressure sensitive adhesive described in German Patent No. 33 31 016. In addition, the stretch releasing adhesive tape of the present invention can include a splittable layer such as the layers described in PCT International Publication No. WO 98/21285, or a re-fastenable layer such as the layers described in PCT International Publication No. WO 99/31193.

FIG. 3A illustrates the stretch releasing adhesive tape 50 adhered to a substrate 22 in an uncompressed state 52. The adhesive side surfaces 54 have a potential contact surface area 56 defined by arc length 60 times length 62. The first interface surface area 58, however, is defined by arc length 64 times the length 62. The circular cross section of the stretch releasing adhesive 50 causes the first interface surface area 58 with the substrate 22 to be significantly smaller than the potential contact surface area 56.

FIG. 3B illustrates the stretch releasing adhesive tape 50 of FIG. 3A in the compressed state 70. In the compressed state 70, the potential contact surface area 56 defines a second interface surface area 72 greater than the first interface surface area 58. The "second interface surface area" refers to the surface area formed at the actual physical interface between the stretch releasing adhesive tape and the substrate 22 in the compressed state. In the embodiment of FIG. 3B, the second interface surface area 72 is defined by the width 71 times the length 62. As illustrated in FIG. 3B, the second interface surface area 72 is less than the potential contact surface area 56, although in some embodiments, they can be substantially the same.

Due to the increase in surface area, the stretch releasing adhesive tape 50 has greater adhesion with the substrate 22 in the compressed state 70 than in the uncompressed state 52. By selectively leaving portions of the stretch releasing adhesive tape 50 in the uncompressed state, those portions can be later removed from the substrate 22 and used as pull tabs (see FIGS. 10 and 11). Additionally, the first interface surface area 58 can be made sufficiently small that the pressure sensitive adhesive tape 50 can be easily repositioned prior to compression into the compressed state 70.

Figure 4A:
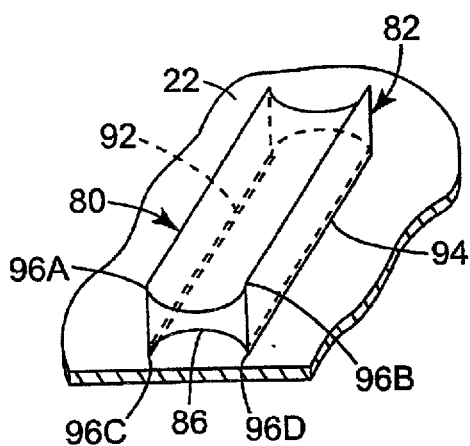
FIG. 4A is a perspective view of an alternate stretch releasing adhesive tape in an uncompressed state in accordance with the present invention.

FIG. 4A illustrates an alternate stretch releasing adhesive tape 80 in an uncompressed state 82 in accordance with the present invention. The stretch releasing adhesive tape 80 includes a series of raised portions 96A, 96B, 96C, 96D. A non-planar adhesive contact surface 86 includes raised portions 96C, 96D. Raised portions 96C, 96D define a pair of narrow, discrete first interface surface areas 92, 94, respectively, with the substrate 22 in the uncompressed state 82. Rather than the single continuous interface surface area 58 of FIG. 3A, the interface surface areas 92, 94 are discrete and discontinuous. In the uncompressed state 82, the level of adhesion generated by the first interface surface areas 92, 94 is sufficiently low that a user can reposition the stretch releasing adhesive tape 80 or detach a portion of the stretch releasing adhesive tape 80 from the substrate 22 and use the detached portion as a pull tab.

Figure 4B:
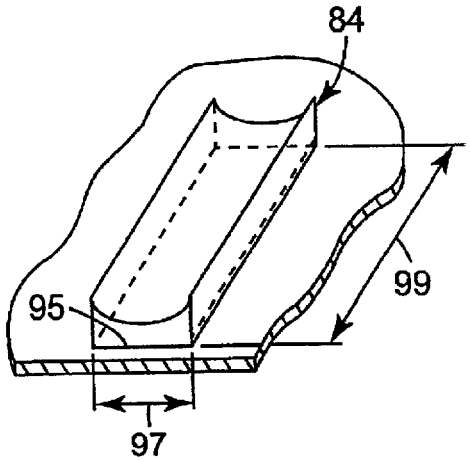
FIG. 4B is a perspective view of the stretch releasing adhesive tape of FIG. 4A in the compressed state.

FIG. 4B illustrates the stretch releasing adhesive tape 80 of FIG. 4A in a compressed state 84. In the compressed state 84, the first interface surface areas 92, 94 are expanded to form the second interface surface area 95 that is defined by the width 97 times the length 99. In the embodiment of FIG. 4B, the second interface surface area 95 is substantially the same as the potential contact surface area 86. Once the stretch releasing adhesive tape 80 is compressed against the substrate 22, as illustrated in FIG. 4B, it cannot be easily removed without a pull tab. By selectively leaving portions of the stretch releasing adhesive tape 80 in the uncompressed state, the uncompressed portions can be used as pull tabs.

Figure 5A:
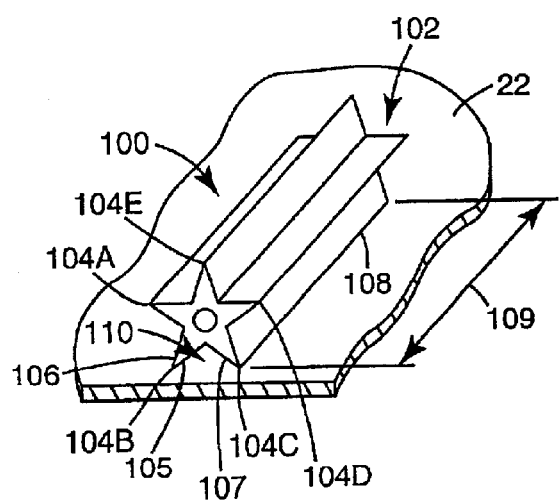
FIG. 5A is perspective view of a stretch releasing adhesive tape in an uncompressed state in accordance with the present invention.
Figure 5B:
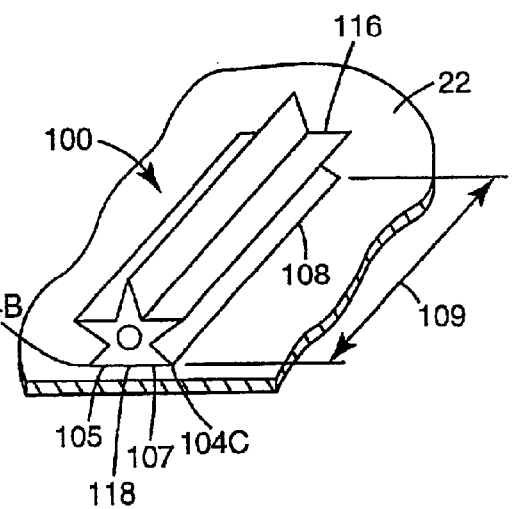
FIG. 5B is perspective view of the stretch releasing adhesive tape of FIG. 5A in the compressed state.

FIGS. 5A and 5B illustrate a cross sectional view of an alternate stretch releasing adhesive tape 100 in accordance with the present invention. FIG. 5A illustrates the stretch releasing adhesive tape in the uncompressed state 102. In the uncompressed state 102, the stretch releasing adhesive tape 100 includes a series of raised portions 104A, 104B, 104C, 104D, 104E. Potential contact surface area 110 is defined by the segments 105, 107 times the length 109. In the uncompressed state 102, however, tips of the raised portions 104B, 104C times the length 109 define a pair of discontinuous, non-planar first interface surface areas 106, 108 with the substrate 22. The sum of the first interface surface areas 106, 108 is significantly smaller than the potential contact surface area 110. If a portion of the stretch releasing adhesive tape 100 is retained in the uncompressed state 102, that portion can be removed from the substrate 22 and used as a pull tab or repositioned.

FIG. 5B illustrates the stretch releasing adhesive tape 100 of FIG. 5A in a compressed state 116. Raised portions 104B and 104C have been collapsed against the substrate 22 so that the second interface surface area 118 is the sum of the segments 105, 107 times the length 109, substantially the same as the potential contact surface area 110.

Figure 6A:
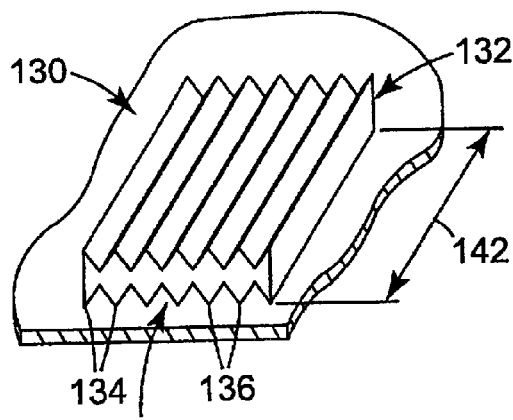
FIG. 6A is perspective view of a stretch releasing adhesive tape in an uncompressed state in accordance with the present invention.
Figure 6B:
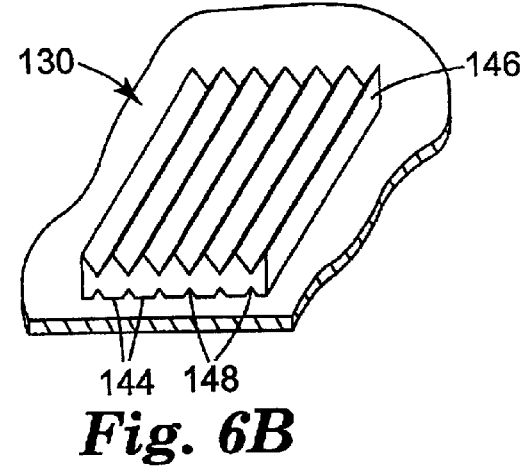
FIG. 6B is a perspective view of the stretch releasing adhesive tape of FIG. 6A in the compressed state.

FIG. 6A and 6B illustrate an alternate stretch releasing adhesive tape 130 in accordance with the present invention. FIG. 6A illustrates the stretch releasing adhesive tape 130 in the uncompressed state 132. The stretch releasing adhesive tape 130 includes a series of longitudinal ridges or raised portions 134 that define the first interface surface area 136. The raised portions 134 can be formed on one or more surfaces of the stretch releasing adhesive tape 130. In the embodiment illustrated in FIG. 6A, the first interface surface area 136 is a series of elongated strips that correspond to the tips of the raised portions 134. The potential contact surface area 138 is defined by the contour of the raised portions 134 times the length 142 of the stretch releasing adhesive tape 130. The first interface surface area 136, however, is significantly smaller than the potential contact surface area 138 due to the non-planar structure defined by the ridges 134.

FIG. 6B illustrates the stretch releasing adhesive tape 130 of FIG. 6A in the compressed state 146. In the embodiment illustrated in FIG. 6B, the second interface surface area 144 is greater than the first interface surface area 136, but less than the potential contact surface area 138. This result is due to incomplete compression of the stretch releasing adhesive tape 130 at the locations 148 against the substrate 22. In an alternate embodiment, the stretch releasing adhesive tape 130 is fully compressed so that the second interface surface area 144 is substantially the same as the potential contact surface area 138.

Figure 7:
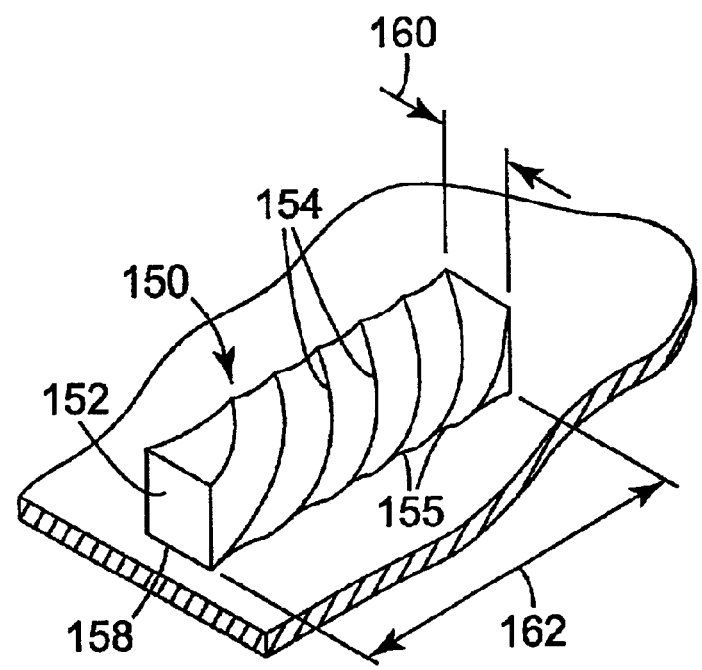
FIG. 7 is a perspective view of a stretch releasing adhesive tape with helical ridges in accordance with the present invention.

FIG. 7 illustrates an alternate stretch releasing adhesive tape 150 with a generally rectangular cross section 152 that has been twisted to form a series of helical ridges or raised portions 154. The helical ridges 154 form discrete raised portions that define a first interface surface area 155 significantly smaller than the potential contact surface area 158 defined by the width 160 and length 162 of the stretch releasing adhesive tape 150 in the un-twisted state.

Figure 8:
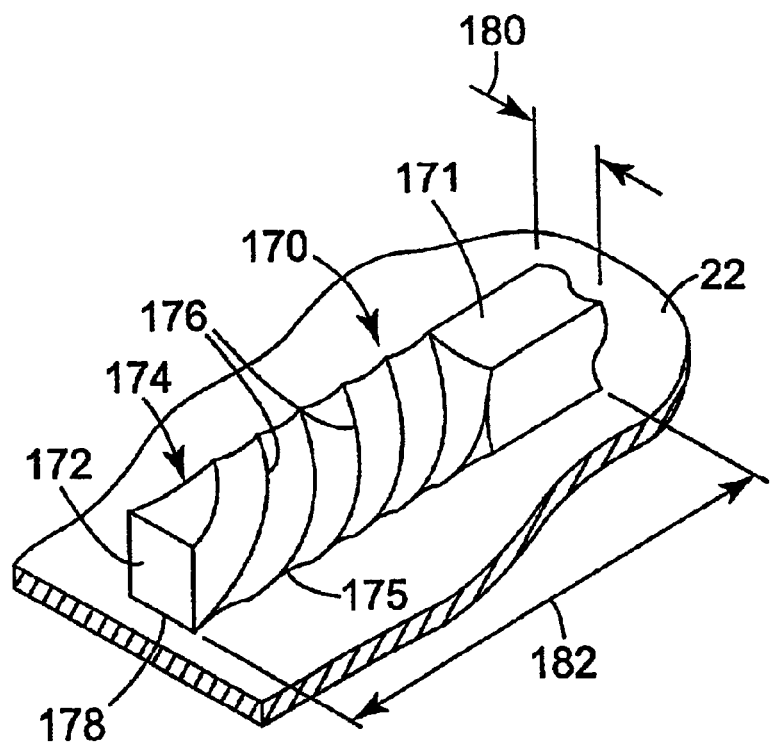
FIG. 8 is a perspective view of a stretch releasing adhesive tape with a rectangular portion and a portion with helical ridges in accordance with the present invention.

FIG. 8 illustrates an alternate stretch releasing adhesive tape 170 having a generally rectangular cross section 172. Portion 171 of the stretch releasing adhesive tape 170 is compressed against the substrate 22 in its rectangular form. Distal end 174 is twisted to define a plurality of helical ridges or raised portions 176. The distal end 174 is retained in its uncompressed state so that the helical ridges 176 define a first interface surface area 175 significantly smaller than the potential contact surface area 178 for the distal portion 174 (as defined by the width 180 and length 182). The ridges 176 permit that the distal end 174 to be removed from the substrate 22 to serve as pull tab for detaching the compressed portion 171 from the substrate 22.

Figure 9A:
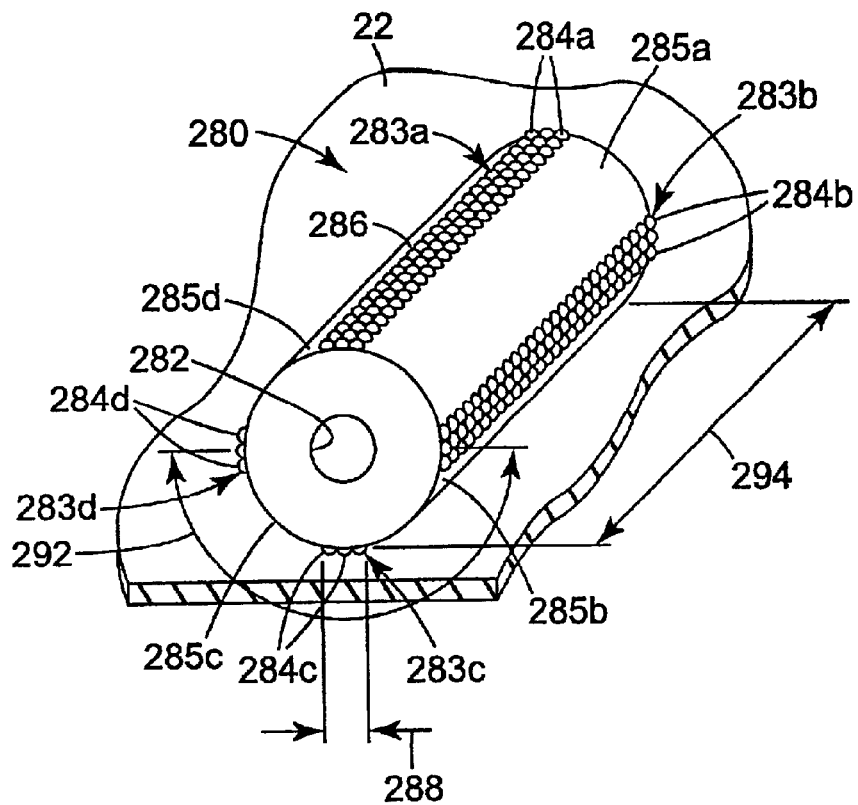
FIG. 9A is perspective view of a stretch releasing adhesive tape with discontinuous adhesive regions in an uncompressed state in accordance with the present invention.

FIG. 9A illustrates a hollow stretch releasing adhesive tape 280 having a center aperture 282 and a series of adhesive regions 283a, 283b, 283c, 283d (referred to collectively as 283) each having a plurality of discrete raised portions or bumps 284a, 284b, 284c, 284d (referred to collectively as 284). The adhesive regions 283 can be continuous or discontinuous, regularly shaped or irregularly shaped, longitudinally oriented or spiral strips, or a variety of other configurations. The raised portions or bumps 284 can be a variety of shapes, such as cones, pyramids, hemispherical projections, or irregular shape protrusions. A series of non-adhesive regions 285a, 285b, 285c, 285d are positioned between the adhesive regions 283. In the uncompressed state 286, only the tips of the raised adhesive portions 284c are in contact with the substrate 22, defining a relatively small first interface surface area 288. In the uncompressed state 286, the first interface surface area 288 permits the stretch releasing adhesive tape 280 to be repositioned or removed from the substrate 22 to serve as a pull tab.

Potential contact surface area 290 is defined by the arc length 292 times the length 294. As is clear from FIG. 9A, the potential contact surface area 290 includes adhesive region 283c, portions of adhesive regions 283b, 283d and non-adhesive regions 285b, 285c.

Figure 9B:
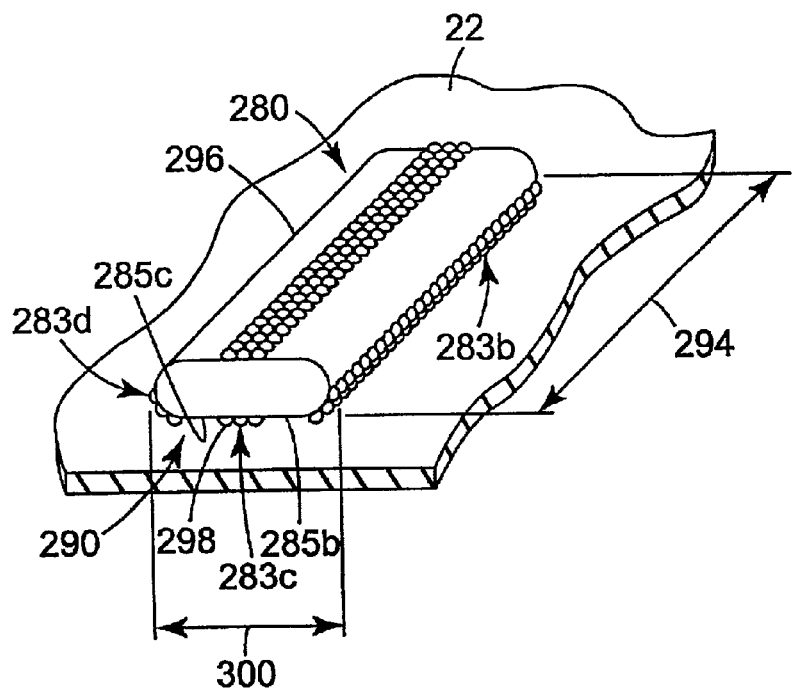
FIG. 9B is a perspective view of the stretch releasing adhesive tape of FIG. 9A in the compressed state.

FIG. 9B illustrates the stretch releasing adhesive tape 280 of FIG. 9A in the compressed state 296. Aperture 282 facilitates compression. In the compressed state 296, second interface surface area 298 is greater than the first interface surface area 288. The second interface surface area 298 is defined by the width 300 times the length 294. The second interface surface area 298 includes the adhesive region 283c, portions of the adhesive regions 283b, 283d and the non-adhesive regions 285b, 285c. In the embodiment illustrated in FIG. 9B, the second interface surface area 298 is less than the potential contact surface area 290, although in some embodiments, they can be substantially the same.

Figure 10:
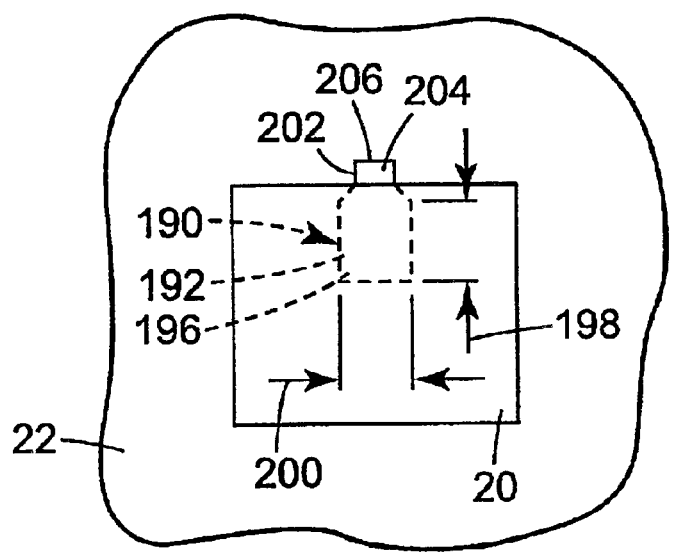
FIG. 10 is a front view of an article attached to a substrate using a stretch releasing adhesive tape in accordance with the present invention.

FIG. 10 is a front view of an article 20 attached to a substrate 22 using a stretch releasing adhesive tape 190 in accordance with the present invention. Portion 192 of the stretch releasing adhesive tape 190 is compressed between the substrate 22 and the article 20. Compressed portion 192 defines a second interface surface area 196 having a length 198 and a width 200.

Exposed portion 202 of the stretch releasing adhesive tape 190 is retained in an uncompressed state 204. The geometry of the exposed portion 202 defines a first interface surface area 206 with the substrate 22 that is less then the potential contact surface area available for engagement with the substrate 22. Consequently, the level of adhesion of the exposed portion 202 is low enough to permit it to serve as a pull tab for removing the compressed portion 192 from the substrate 22.

Figure 11:
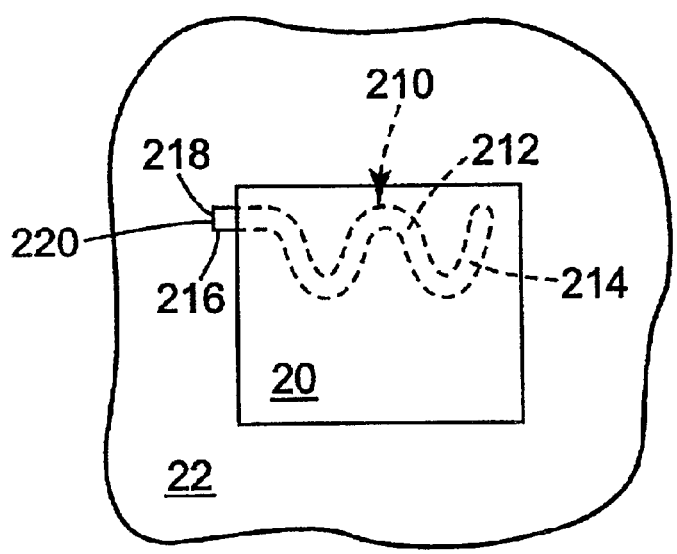
FIG. 11 is a front view of an article attached to a substrate using an alternate stretch releasing adhesive in accordance with the present invention.

FIG. 11 is a front view of an alternate stretch releasing adhesive tape 210 in accordance with the present invention. Compressed portion 212 is located between the article 20 and substrate 22. Due to the geometry of the stretch releasing adhesive tape 210, the compressed portion 212 can follow a serpentine or other non-linear path, thereby increasing the size of the interface surface area 214, and hence the adhesive bond between the substrate 22 and article 20.

The exposed portion 216 is retained in an uncompressed state 218. Due to the geometry of the stretch releasing adhesive tape 210, the first interface surface area 220 of the exposed portion 216 is formed by raised portions, non-planar surfaces, discontinuous surfaces and other structures that define a surface area significantly less than the potential contact surface area. Therefore, the exposed potion 216 can be easily removed from the substrate 22 to form a pull tab for removing the stretch releasing adhesive tape 210.

Figure 12:
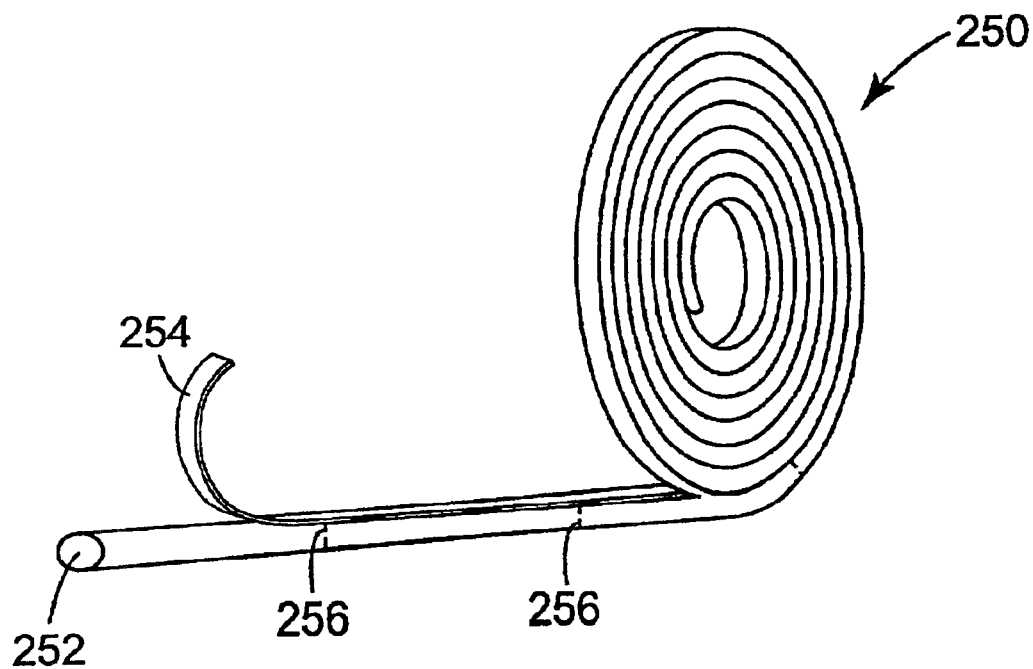
FIG. 12 is a perspective view of a stretch releasing adhesive tape in roll form in accordance with the present invention.

FIG. 12 illustrates a roll 250 of a stretch releasing adhesive 252 in accordance with the present invention. In the illustrated embodiment, release liner 254 is located on the stretch releasing adhesive tape 252 to facilitate unrolling. Frangible connections 256 may optionally be formed in the stretch releasing adhesive tape 252 to facilitate removal of sections without the use of a cutting instrument. Frangible connections 256 may be a perforation, slit, cut or other locations of weakness along the length of the stretch releasing adhesive tape 252.

Figure 13:
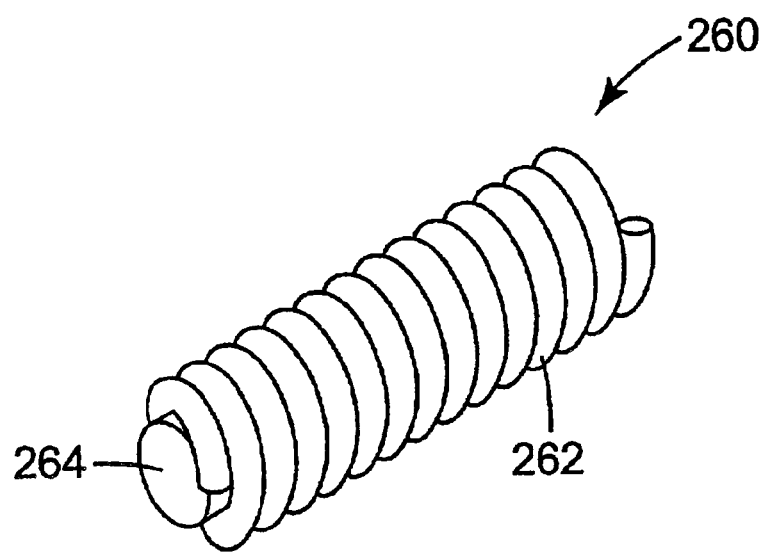
FIG. 13 is a perspective view of an alternate roll of stretch releasing adhesive tape in accordance with present invention.

FIG. 13 is an alternate roll 260 of a stretch releasing adhesive tape 262 in accordance with the present invention.

The stretch releasing adhesive tape is spiral wound on a core 264. The core preferably includes a low adhesion surface or release liner to facilitate removal of the stretch releasing adhesive tape 262.

Examples of materials suitable for use as liners include kraft papers, polyethylene, polypropylene, polyester or composites of any of these materials which can be coated with release agents such as fluorochemicals or silicone. U.S. Pat. No. 4,472,480 describes low surface energy perfluorochemical liners. The preferred liners are papers, polyolefin films, or polyester films coated with silicone release materials. Examples of the silicone coated release papers are Polyslik trade silicone release papers supplied by James River Co., H.P. Smith Division (Bedford Park, Ill.), and silicone coated papers supplied by DCP-Lohja Inc. (Willowbrook, Ill.).

While several embodiments of the invention have been illustrated and described, it will be recognized that various changes and modifications may be made without deviating from the inventive concept set for the above. Any of the features of the various embodiments disclosed herein can be combined.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. An elongated stretch releasing adhesive article with differential adhesive properties in a compressed state and an uncompressed state having a three dimensional cross-section and compressing:

an elongated length of stretch releasing adhesive material with continuously adhesive side surfaces about the periphery of the material, the side surfaces having at least one potential contact surface area, the potential contact surface area comprising a first interface surface area in an uncompressed state prior to adhesion to a substrate surface, and a second interface surface area in a compressed state after adhesion to said substrate surface, said second interface surface area being greater than the first interface surface area.

2. An elongated stretch releasing adhesive article comprising an elongated length of stretch releasing adhesive material with continuously adhesive side surfaces, the side surfaces comprising at least one non-planar potential contact surface area in an uncompressed state.

3. An elongated stretch releasing adhesive article comprising an elongated length of stretch releasing adhesive material with side surfaces, the side surfaces comprising at least one potential contact surface area, the potential contact surface area being discontinuous in an uncompressed state and substantially continuous in a compressed state.

* * * * *

UNITED STATES PATENT AND TRADEMARK OFFICE
CERTIFICATE OF CORRECTION

PATENT NO. : 6,821,619 B2
DATED : November 23, 2004
INVENTOR(S) : Hamerski, Michael D.

It is certified that error appears in the above-identified patent and that said Letters Patent is hereby corrected as shown below:

Column 8,
Line 53, delete "potion", insert in place thereof -- portion --.

Signed and Sealed this

Twenty-seventh Day of September, 2005

JON W. DUDAS
*Director of the United States Patent and Trademark Office*